United States Patent Office.

ARTHUR MAGINNIS AND WILLIAM McCORMICK, OF PHILADELPHIA, PENNSYLVANIA.

Letters Patent No. 100,428, dated March 1, 1870.

IMPROVEMENT IN COLLECTING WASTE SPIRITS FROM BREWERIES AND BARS.

The Schedule referred to in these Letters Patent and making part of the same

We, ARTHUR MAGINNIS and WILLIAM McCORMICK, of the city of Philadelphia, in the State of Pennsylvania, have invented or discovered a certain Process for Utilizing the Waste Spirituous Fluids of Breweries and Drinking-Bars, of which the following is a specification.

It is well known that in breweries of beer and ale, large amounts of the fermenting and fermented malt liquors are wasted or lost in filling, and in the overflowing of the containing vessels, and in cleansing the same for subsequent use, and that a like waste or loss occurs in drinking-bars from the overfilling and the upsetting of the drinking vessels, and from the drainings and washings of the same.

The object of our invention or discovery is to utilize this waste by recovering from it, at small cost, all the spiritous or alcoholic properties which have hitherto gone with it to waste or loss.

We take the accumulated waste liquors of breweries and bars, and gradually heat and pass them through the improved apparatus for which Letters Patent, numbered 87,792, and dated the 16th day of March, 1869, were granted to E. F. & T. D. Prentiss, and thus separate the alcoholic spirits from the water and the dirt or impurities with which the waste liquor has been mixed at the breweries and bars, so as to recover the said alcohol or spirits in a sufficiently pure condition to be used in the arts, and consequently, in so far, we add to the products of value.

We do not desire to claim any particular apparatus for our purpose of recovering the spirituous or useful matter from the really useless portion of the said waste, as the apparatus referred to, when used in the manner described in the specification, fully answers our purpose; but

What we claim as new and of our invention or discovery, is confined to the following:

Claim.

Utilizing the waste spirituous fluids of breweries and drinking-bars, substantially as described herein.

ARTHUR MAGINNIS.
WM. McCORMICK.

Witnesses:
BENJ. MORISON,
WM. H. MORISON.